United States Patent
Lopez Alvarez et al.

(10) Patent No.: US 9,602,306 B2
(45) Date of Patent: Mar. 21, 2017

(54) METHOD, SYSTEM AND APPARATUS FOR EFFICIENT MULTILAYER OPTICAL NETWORKING

(71) Applicant: Telefonica, S.A., Madrid (ES)

(72) Inventors: Victor Lopez Alvarez, Madrid (ES); Juan Pedro Fernandez-Palacios, Madrid (ES); Oscar Gonzalez-De Dios, Madrid (ES)

(73) Assignee: Telefonica, S.A., Madrid (ES)

( * ) Notice: Subject to any disclaimer, the term of this patent is extended or adjusted under 35 U.S.C. 154(b) by 2 days.

(21) Appl. No.: 14/581,181

(22) Filed: Dec. 23, 2014

(65) Prior Publication Data

US 2015/0200790 A1    Jul. 16, 2015

(30) Foreign Application Priority Data

Dec. 26, 2013    (EP) .................................... 13382554

(51) Int. Cl.
  *H04B 17/00* (2015.01)
  *H04J 4/00* (2006.01)
  (Continued)

(52) U.S. Cl.
  CPC ......... *H04L 12/4645* (2013.01); *H04B 10/27* (2013.01); *H04J 14/0298* (2013.01);
  (Continued)

(58) Field of Classification Search
  CPC .............. H04J 14/0227; H04J 14/0204; H04L 27/2613; H04L 12/4633
  (Continued)

(56) References Cited

U.S. PATENT DOCUMENTS 6,570,875 B1 * 5/2003 Hegde ................. H04L 12/4645
                                                     370/389
9,246,703 B2 * 1/2016 Yu ....................... H04L 12/4625
                 (Continued)

OTHER PUBLICATIONS

Jinno, Masahiko, Multiflow Optical Transponder for Efficient Multilayer Optical Networking, May 2012, IEEE Communications magazine.*

(Continued)

*Primary Examiner* — David Payne
*Assistant Examiner* — Pranesh Barua
(74) *Attorney, Agent, or Firm* — Sughrue Mion, PLLC

(57) ABSTRACT

The method comprising: receiving, a controller (106), traffic packets from a device, each one of said traffic packets including a VLAN tag indicating a destination of a second device; analyzing, by a first monitoring unit (101) during a period of time, the bytes content of said received packets and reporting said analysis to said controller (106); receiving, said controller (106), said plurality of different subcarriers to be used for said sending; adding, by a tag unit (102), an embedded S-VLAN tag to said analyzed packets identifying to which subcarrier and to which sliceable bandwidth variable transponder (105) each tagged traffic packets per destination is going to be sent; sending said S-VLAN tagged traffic packets to a switch (104), the latter forwarding them to a given port of said identified sliceable bandwidth variable transponder (105) for sending them via different sub-carriers to its corresponding destination, said plurality of different sub-carriers following a same or different path.

12 Claims, 11 Drawing Sheets

(51) Int. Cl.
  *H04J 14/02* (2006.01)
  *H04L 12/46* (2006.01)
  *H04Q 11/00* (2006.01)
  *H04B 10/27* (2013.01)
(52) U.S. Cl.
  CPC ..... *H04Q 11/0005* (2013.01); *H04Q 11/0066* (2013.01); *H04L 2012/4629* (2013.01); *H04Q 2011/0086* (2013.01)
(58) Field of Classification Search
  USPC .............................................. 398/45, 76, 79
  See application file for complete search history.

(56) References Cited

U.S. PATENT DOCUMENTS

| | | | | |
|---|---|---|---|---|
| 2001/0026384 | A1* | 10/2001 | Sakano | H04B 10/032 398/79 |
| 2004/0218925 | A1* | 11/2004 | Nahm | H04J 14/0227 398/79 |
| 2006/0133811 | A1* | 6/2006 | Gumaste | H04J 14/0227 398/83 |
| 2006/0274868 | A1* | 12/2006 | Chen | H04L 27/262 375/347 |
| 2010/0080167 | A1* | 4/2010 | Cordeiro | H04L 27/2613 370/328 |
| 2011/0261812 | A1* | 10/2011 | Kini | H04L 12/4633 370/389 |
| 2012/0269302 | A1* | 10/2012 | Ancora | H04L 1/0606 375/340 |
| 2012/0269512 | A1* | 10/2012 | Koley | H04B 10/5051 398/65 |
| 2012/0321312 | A1* | 12/2012 | Timm | H04Q 11/0067 398/66 |
| 2013/0004163 | A1* | 1/2013 | Aoki | H04B 10/506 398/34 |
| 2013/0010600 | A1* | 1/2013 | Jocha | H04L 43/026 370/236.2 |
| 2014/0059111 | A1* | 2/2014 | Veeraiyan | H04L 67/02 709/201 |
| 2014/0071984 | A1* | 3/2014 | Morgan | H04L 43/0888 370/389 |
| 2014/0169372 | A1* | 6/2014 | Kardashov | H04L 43/026 370/392 |

OTHER PUBLICATIONS

Masahiko Jinno et al., "Toward Deeply Virtualized Elastic Optical Networks", Optical Fiber Communication Conference and Exposition and the National Fiber Optic Engineers Conference (OFC/NFOEC), 2013, pp. 1-3.

Victor Lopez et al., "Target Cost for Sliceable Bandwidth Variable Transponders in a Real Core Network", Future Network & Mobile Summit 2013, Jul. 3, 2013, pp. 1-9.

Masahiko Jinno et al., "Multiflow Optical Transponder for Efficient Multilayer Optical Networking", IEEE Communications Magazine, May 2012, pp. 56-65.

European Search Report for EP 13 38 2554, dated May 27, 2014.

* cited by examiner

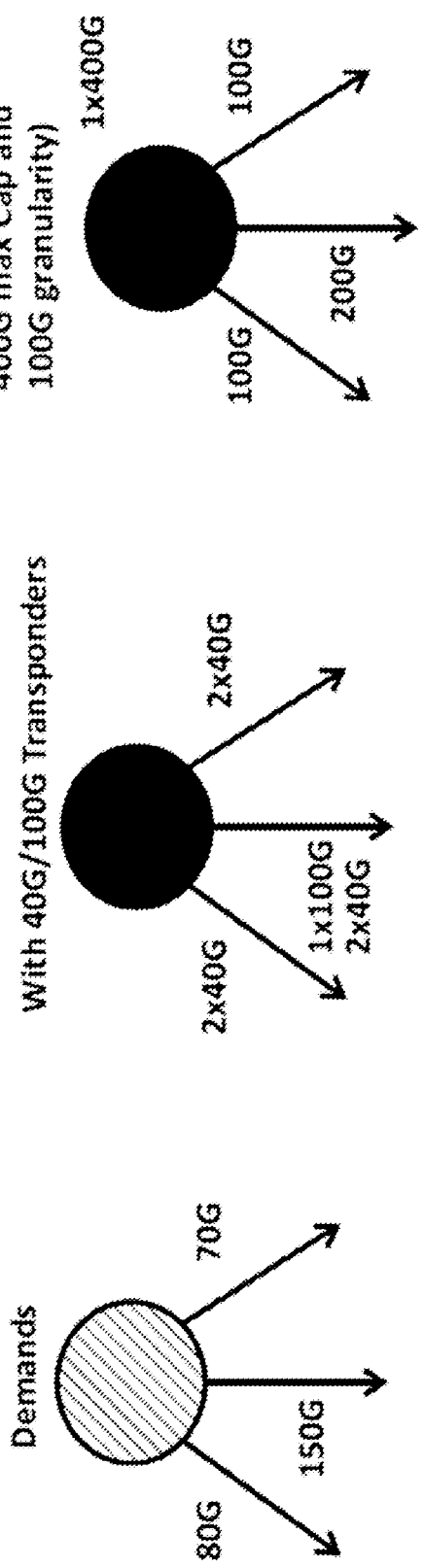

Mean traffic between routers (Gbps)

|   | A  | B  | C  | D   | E  |
|---|----|----|----|-----|----|
| A |    | 80 | 40 | 60  | 40 |
| B | 30 |    | 90 | 20  | 50 |
| C | 50 | 50 |    | 100 | 60 |
| D | 70 | 40 | 30 |     | 70 |
| E | 90 | 20 | 50 | 80  |    |

METHOD, SYSTEM AND APPARATUS FOR EFFICIENT MULTILAYER OPTICAL NETWORKING

FIELD OF THE INVENTION

The present invention generally relates to networking technologies. Particularly, present invention relates to a method, a system and an apparatus for efficient multilayer optical networking

BACKGROUND OF THE INVENTION

The ever increasing demand for transmission capacity and higher signal speeds is driving the development of advanced technologies that allow a better use of deployed resources as well as an increase in transport rates. Existing DWDM systems divide the C-band optical spectrum into discrete bands, spaced usually by 50 or 100 GHz, and standardized by the ITU (FIG. 1). A transponder provides an individual wavelength carrying a client demand (which might be Ethernet or OTN, and might have a payload of anything up to 100 Gb/s), which can be accommodated in just one of these bands. Some of the demands fit comfortably between the 50 GHz grid boundaries (like d1, d4 or d5), whereas others (like d2 or d8) are too broad. Optical filters, specified to the ITU fixed grid will impose large filtering penalties as shown in FIG. 1.

This means that the resulting DWDM network is somewhat inflexible to changes in bandwidth demand. Although further transponders can be installed to cope with additional demands, this is a very slow process that can typically take many weeks due to the great deal of manual processes involved, e.g. placing the order for a new transponder, conducting the necessary installation and provisioning, testing, etc. Moreover, future high bit rate transponders, such as 400 Gb/s and above, are expected to utilize wider bandwidths than the current 50 GHz grid. Therefore, current infrastructure would not be able to support them. Therefore, large bandwidth demands would have to be divided up so that they can be carried over the fixed grid.

Elastic Optical Networks make it possible to use the optical spectrum in a more flexible way (FIG. 2). For instance, variable-size spectrum slices can be defined and allocated depending on the bandwidth requirements of individual channels. The ITU-T has recognized the requirement for a spectrum allocation scheme that provides more flexibility than the conventional 50-GHz grid. Therefore, the revised G694.1 recommendation considers a flexible DWDM grid with 12.5-GHz frequency slot granularity and 6.25-GHz central frequency granularity [2]. The EON approach advocates the use of new building blocks for an extended flexibility on resource assignment (be it capacity or spectrum) and an optimized use of the network capacity.

The main blocks of EON are the flexi-grid ROADM and the Bandwidth Variable Transponder (BVT). Flexi-grid ROADMs can filter signals with a granularity of 12.5 GHz, instead of 50 GHz like in current WDM systems. On the other hand, BVTs can adjust their transmission rate to the actual traffic demand, by expanding or contracting the bandwidth of an optical path (i.e. varying the number of subcarriers) and by modifying the modulation format, as depicted in FIG. 3a. There have been several demonstrations of bitrate-variable transmitters where the number of subcarriers or the modulation format is adapted to achieve the desired bitrate and spectral efficiency [3, 4].

However, when a high-speed BVT is operated at lower than its maximum rate, e.g. due to required reach or impairments in the optical path, part of the BVT capacity is wasted. In order to address this issue the Sliceable BVT (SBVT) has been proposed [1]. A SVBT is able to allocate its capacity into one or several optical flows that are then transmitted to one or several destinations, as illustrated in FIG. 3b. Thus, when an SBVT is used to generate a low bit rate channel, its remaining capacity can also be exploited for transmitting other independent data flows.

From the point of view of higher layers, an SBVT may be viewed either as a high-capacity BVT or as a collection of multiple logically/virtually independent lower-capacity BVTs, depending on the mode of operation. Possible BVT and SBVT configurations utilizing Nyquist WDM are shown in FIG. 4.

The BVT, shown in FIG. 4a, comprises multiple light sources, modulators, quasi-ideal optical filters and a coupler. Multiple light sources, with spacing very close to the Nyquist limit, are independently modulated, filtered and coupled together in order to generate a multicarrier superchannel. The super-channel bit rate and bandwidth can be tuned by changing the modulation format (and carrier spacing) or by turning off unused carriers. The same configuration can be used to construct a SBVT by making the light sources and optical filters tunable. Thus, one or more carriers can be selected and utilized for transmission towards different destinations using different spectral bands, as shown in FIG. 4b. The number of carriers used for each optical flow is determined by the required channel bit rate.

Based on commercially available technologies is possible to implement SBVT. FIG. 5 depicts an example for a 400 Gbps SBVT. Thanks to Photonic Integrated Circuits (PIC), it is possible to have multiple carriers in the same component. Modulation formats can be programmed externally for each of the carriers. This example is based on carriers of 100 Gbps, which are transmitted using DP-QPSK. Next section presents different proposals for interconnect routers and SBVTs.

Existing solutions are similar to the one presented in FIG. 5. Using this architecture, network operators can reduce the number of transponders in the network and, consequently, the number of IP cards that are required in the network deployment. Let us assume a node demand as the one presented in FIG. 6a. Using transponders of 40 G and 100 G, six transponders are required to cope with the demands in FIG. 6a. These are: 1×100 G transponder for 80 G demand, 1×100 G and 2×40 G transponders for 150 G demand and 2×40 G transponders for 70 G demands. FIG. 6b shows the number of transponders required for each demand. In the case of using SBVTs (FIG. 6c) one SBVT of 400 G is required to cope with the demands in FIG. 6a. As the minimum granularity of this transponder is 100 G, the first demand (80 G) consumes 100 G, the second (150 G) uses 200 G and the third one (70 G) occupies 100 G.

The main problem of current SBVTs, which configures just the optical connections, is that there is not a system to reuse the optical resources for multiple flows, thus reducing the optical pipes utilization. When there is a fixed capacity, over-provisioning is the only solution to cope with users demands (FIG. 7).

Furthermore, state of the art SBVT implementations (e.g. FIG. 5) present very coarse optical granularity (e.g. 100 Gbps per flow). According to it, the number and power consumption of SBVTs required for a given traffic demand could be very high.

These figures could be reduced by improving SBVT granularity per flow. Finer granularity could be achieved by using: 1) New optical transmission technologies (e.g. Nyquist DWDM) and very precise optical filters or 2) Multilayer control mechanisms enabling L2 traffic flows going to a given destination to be split into different VLANs which could route over different paths.

Present invention is focused on the second alternative. While first option requires new hardware development the second one could be implemented over state of the art transmission and switching technologies. In particular, present invention enhances S-BVT performance and efficiency by enabling load balancing between packet and optical switching layers.

REFERENCES

[1] Jinno, M.; Takara, H.; Sone, Y.; Yonenaga, K.; Hirano, A., "Multiflow optical transponder for efficient multilayer optical networking," Communications Magazine, IEEE, vol. 50, no. 5, pp. 56-65, May 2012
[2] International Telecommunication Union. SG15 meeting results, Geneva, December 2011. URL http://www.itu.int/rec/T-REC-G.694.1/.
[3] M. Jinno, H. Takara, B. Kozicki, Y. Tsukishima, T. Yoshimatsu, T. Kobayashi, Y. Miyamoto, K. Yonenaga, A. Takada, O. Ishida, and S. Matsuoka, "Demonstration of novel spectrum-efficient elastic optical path network with per channel variable capacity of 40 Gb/s to over 400 Gb/s," In Optical Communication, 2008. ECOC 2008. 34th European Conference on, pages 1-2, September 2008. doi: 10.1109/ECOC.2008.4729581.
[4] David J. Geisler, Nicolas K. Fontaine, Ryan P. Scott, Loukas Paraschis, Ori Gerstel, and S. J. B. Yoo, "Flexible bandwidth arbitrary modulation format, coherent optical transmission system scalable to terahertz BW," In European Conference and Exhibition on Optical Communication (ECOC), 2011 37th, pages 1-3, September 2011.

SUMMARY OF THE INVENTION

According to a first aspect there is provided a method for efficient multilayer optical networking that comprises a) receiving, a controller unit, traffic packets from a first packet generating device, each one of said traffic packets including an embedded virtual LAN or VLAN tag indicating a destination of a second packet generating device; and b) sending, an sliceable bandwidth variable transponder in an optical network, said received tagged traffic packets via a plurality of different sub-carriers to its corresponding destination, said plurality of different sub-carriers following a same or different path.

On contrary of the known proposals the proposed method, within said step a), comprises a1) analyzing, by a first monitoring unit during a period of time that depends on the type of network traffic frames, e.g. a monitoring time, the bytes content of said received tagged traffic packets and reporting the result of said analysis to said controller unit; a2) receiving, said controller unit, said plurality of different subcarriers to be used for said sending; a3) adding, by a tag unit, an embedded secondary virtual LAN or S-VLAN tag to said analyzed tagged traffic packets, identifying depending of its destination to which subcarrier and to which sliceable bandwidth variable transponder each tagged traffic packets per destination is going to be sent, said adding being based on a mapping procedure executed by a rule generator unit indicating which field of the received tagged traffic packets be matched, said matching procedure at least matching the last bit of the received tagged traffic packets; and a4) sending said S-VLAN tagged traffic packets to a switch, the latter forwarding them to a given port of said identified sliceable bandwidth variable transponder for performing said step b).

The method in a preferred embodiment continuously analyzes or monitors the incoming traffic detecting when the number of allocated subcarriers is very high (congestion may happen) or very low (under use of the resources which could be allocated for other traffic) and sends feedback to the control plane. The control plane (or an external entity) then can decide to re-optimize the subcarrier assignments, or even the paths.

The mapping procedure includes a feedback mechanism performed by a second monitoring unit analyzing the traffic of said identified subcarriers during a period of time or monitoring time that also will depend on the type of network traffic frames. In an embodiment, the period of time in which said traffic of the identified subcarrier is analyzed and the period of time in which the bytes content of the received tagged traffic packets are analyzed are the same.

The rule created in the matching procedure can be executed by hardware in the system. The rule is able to provide an arbitrary traffic distribution, and includes a feedback mechanism. Preferably, in order the rule to be fast, it may not get the desired distribution profile at the first attempt. In an embodiment the matching is done to the last two bits of the address.

The proposed method can use the transmission and switching technologies of the SBVT presented in FIG. 5. For example it can have 4 carriers at 100 Gbps using DP-QPSK modulation over 37.5 GHz.

According to a second aspect there is provided a system for efficient multilayer optical networking, comprising: control means at least configured to receive from a first packet generating device, traffic packets including an embedded virtual LAN or VLAN tag indicating a destination of a second packet generating device; and an sliceable bandwidth variable transponder in an optical network configured to send said received tagged traffic packets via a plurality of different sub-carriers to its corresponding destination, said plurality of different sub-carriers following a same or different path.

On contrary of the known proposals the system further includes:

first monitoring means configured to analyze, during a period of time, the bytes content of said received tagged traffic packets and to report the result of said analysis to said control means;

said control means further configured to receive said plurality of different subcarriers to be used for said sending;

tagging means configure to add a secondary virtual LAN or S-VLAN tag to said analyzed tagged traffic packets and to identify, depending of its destination, to which subcarrier and to which sliceable bandwidth variable transponder each tagged traffic packets per destination is going to be sent;

a rule generator unit configured to indicate which field of the received tagged traffic packets be matched in a matching procedure at least matching the last bit of the received tagged traffic packets;

means for sending said S-VLAN tagged traffic packets to a switch unit, the latter configured to forward them to a given port of said identified sliceable bandwidth variable transponder; and a plurality of interfaces configured to connect said different means.

In an embodiment, the first and second packet generating device to which the proposed system is connected are an interface of an IP/MPLS router. Therefore, present invention will enable a given traffic flow between two routers to be transported over different optical subcarriers which could be routed over different paths.

In an embodiment, the first and second packet generating device to which the proposed system is connected are an optical node, sending the traffic in any of its SVBT in a flexible way.

The system may further include second monitoring means configured to analyze the traffic of said identified subcarriers during a period of time and to report a feedback of said monitoring to said tagging means.

In an embodiment, said tagging means and said switch unit are configured to implement an Open Flow protocol.

In yet another embodiment, said tagging means, said second monitoring means and said switch unit can be arranged in a same physical device or on contrary in different physical devices.

According to a third aspect there is provided an apparatus for efficient multilayer optical networking, comprising:
  control means configured to receive from a first packet generating device, traffic packets including an embedded virtual LAN or VLAN tag indicating a destination of a second packet generating device and to receive a plurality of different subcarriers of an sliceable bandwidth variable transponder of an optical network to be used for sending said received traffic packets to its corresponding destination;
  first monitoring means configured to analyze, during a period of time, the bytes content of said received tagged traffic packets and to report the result of said analysis to said control means;
  tagging means configured to add a secondary virtual LAN or S-VLAN tag to said analyzed tagged traffic packets, and to identify depending of its destination to which subcarrier and to which sliceable bandwidth variable transponder each tagged traffic packets per destination is going to be sent,
  a rule generator unit configured to indicate which field of the received tagged traffic packets be matched in a matching procedure at least matching the last bit of the received tagged traffic packets; and
  a switch unit configured to forward said S-VLAN tagged traffic packets to a given port of said identified sliceable bandwidth variable transponder.

The apparatus, in an embodiment, further includes second monitoring means configured to analyze the traffic of said identified subcarriers during a period of time and to report a feedback of said monitoring to the tagging means.

Moreover, the apparatus may further include a transponder controller that configures the SVBT with the necessary control commands. For new connection, this module configures the number of subcarriers that are bundled together, their assigned spectrum slot and their modulation format (QPSK, QAM-X, etc.).

Present invention enables the efficient utilization of the network resource and bandwidth adjustment of the packet flows compared with state of the art solutions. State of the art classification of flows requires significant power consumption and processing power. This solution uses state of the art transmission technologies, but goes beyond this thanks to the dynamic bandwidth adjustment using packet flows requirements and existing optical connections. Moreover, this approach does not require any hardware development like solutions based on new optical transmission technologies, which require very precise optical filters. Bandwidth used in the optical connections is adjusted to the packet flows requirements, as shown in FIG. 10.

BRIEF DESCRIPTION OF THE DRAWINGS

The previous and other advantages and features will be more fully understood from the following detailed description of embodiments, with reference to the attached, which must be considered in an illustrative and non-limiting manner, in which:

FIG. 6A is a dimensioning example based on state of the art technologies for SBVT where a node demand is represented.

FIG. 6B is a dimensioning example based on state of the art technologies for SBVT representing the number of transponders required for each demand.

FIG. 6C is a dimensioning example based on state of the art technologies for SBVT where one SBVT required to cope with the demand is represented.

DETAILED DESCRIPTION OF SEVERAL EMBODIMENTS

Figure 9:
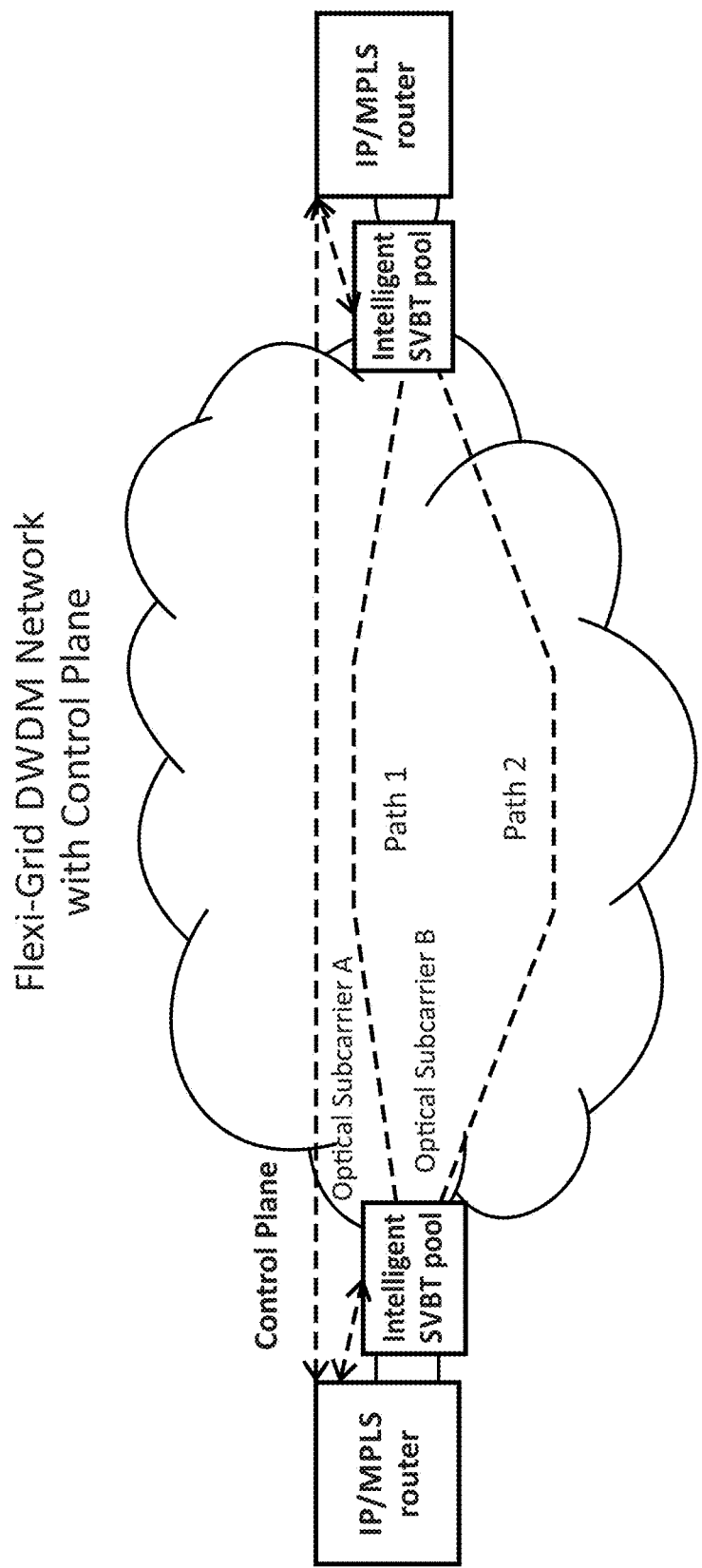
FIG. 9 illustrates an embodiment of the proposed solution for performing an efficient multilayer optical networking, in this particular embodiment with two paths.
Figure 10:
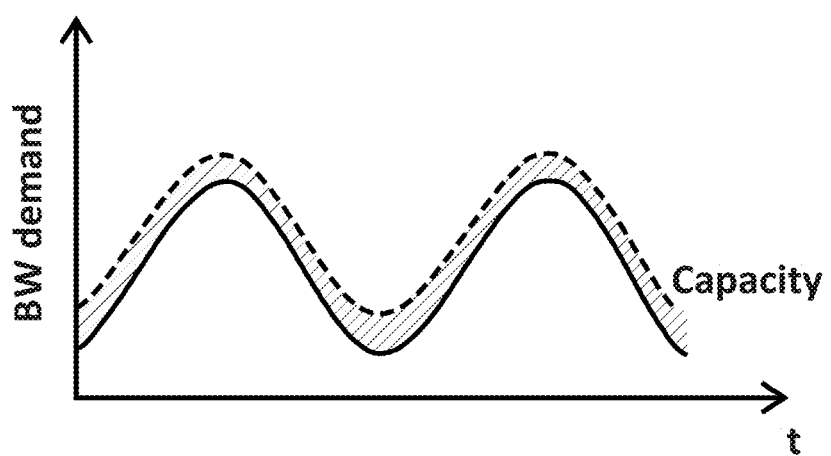
FIG. 10 illustrates how the elastic bandwidth is adjustment through the present invention.

In reference to FIG. 9 it is illustrated an embodiment of the present invention, in this case, the proposed apparatus or intelligent SVBT pool as termed in the figure, is connected to a traffic source, e.g. to an in interface of an IP/MPLS router.

Figure 11:
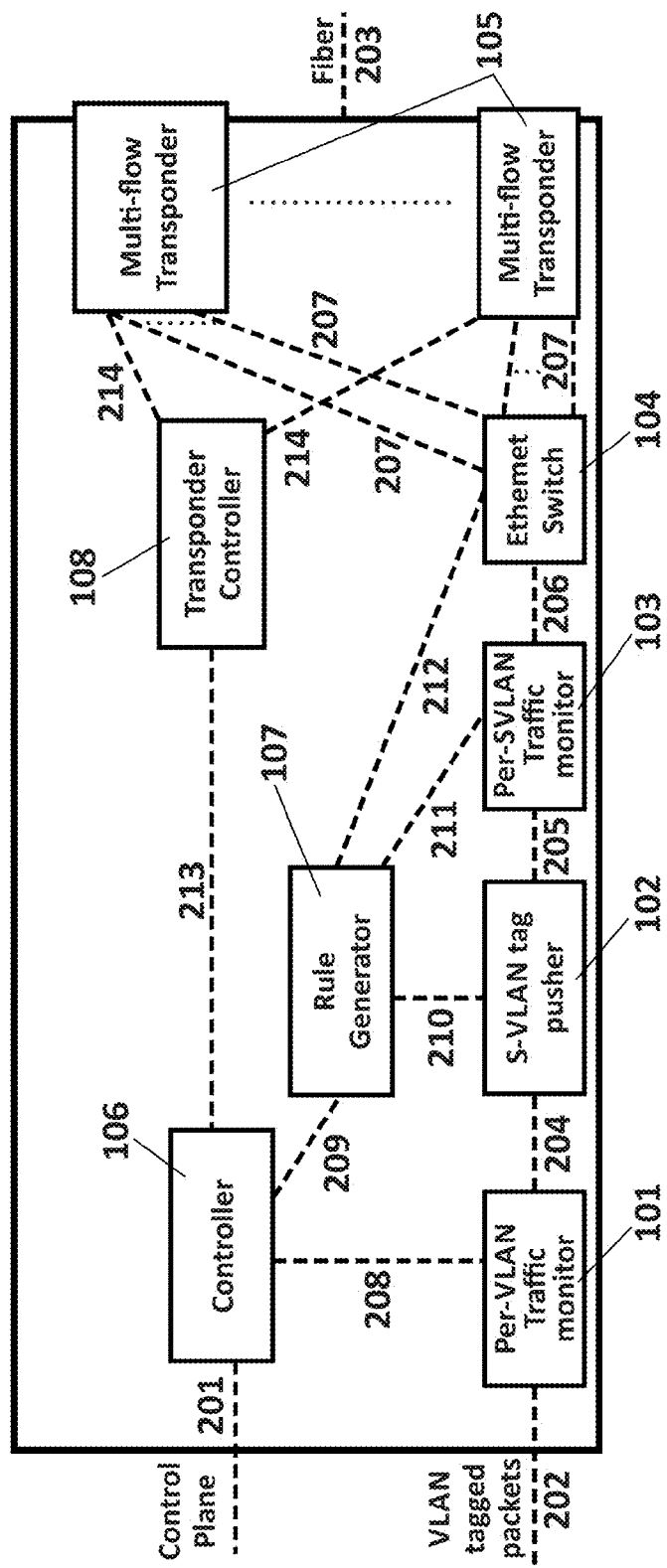
FIG. 11 illustrates the proposed apparatus of the third aspect of the present invention according to different embodiments.

The intelligent SVBP pool in FIG. 9, which is illustrated in detail in FIG. 11, receives packets traffic, such as Ethernet frames, tagged with 802.1Q VLAN field, from an Input Ethernet Interface 202. The source of such traffic can be any packet-generating device. However, according to the embodiment of FIG. 9 as according to the main scope of the invention, this source of the traffic is a core network router that sends aggregated traffic of thousands 5 of users.

Then, the incoming traffic or tagged traffic packets is first measured or analyzed in a first monitoring unit/means or Per-VLAN traffic monitor module 101, with the aim of, on the one hand, detecting deviations from the bandwidth assigned, and on the other hand, to help in determining how much traffic is really needed to be sent to the subcarriers. Through an external interface to the controller 201, the system receives the information of the set of subcarriers that are assigned to each VLAN, and how much traffic is expected for such VLAN. Thus, as this information is usually based on a prediction of the operator or the person who configures the network, it is not necessary always true when the network evolves. Thus, the invention preferably continuously monitors the incoming traffic detecting when the number of allocated subcarriers is very high (congestion may happen) or very low (under use of the resources which could be allocated for other traffic) and send feedback to the control plane through the interface to the controller 201.

After the traffic has been measured, it is tagged with secondary virtual LAN tags or S-VLAN tags in a tag unit or S-VLAN tag pusher module 102. Each S-VLAN tag identifies one of the SBVTs (Sliceable Bandwidth Variable Transponder) of the invention, and the subcarrier of such SBVT or Multi-flow Transponders (modules 105) where the packet has to be sent. A SBVT is a transponder with one input per subcarrier and one common output. S-VLAN tag pusher module 102 is configured with a rule to match the incoming tagged traffic packets and assign the desired VLAN. For example, a given VLAN needs to be sent to two subcarriers, each following a different path.

Then, the traffic split in an embodiment could be as follows: 50% to one subcarrier and 50% to another subcarrier. A possible rule is that all incoming tagged traffic packets that have such VLAN and whose last bit of the IP address field is 0 go to the first subcarrier (that is, a certain S-VAN tag is added), and the rest of the tagged traffic packets to the second subcarrier (that is, a different S-VLAN tag is added).

How these rules (that is, which S-VLAN is assigned to a packet that has a combination of VLAN and a set of bits of a field in its header) are generated is done by a Rule generator unit 107. Such unit includes a matching procedure to determine efficient matching rules which can be executed by hardware in a scalable way. For example, a fine grained detection of the flows would produce excellent results, but would be unfeasible for high speeds, or would need extremely costly hardware resources.

The invention includes a feedback mechanism by measuring the traffic assigned to each S-VLAN (that is, the traffic to each subcarrier). This measurement is done by a second monitoring unit/means or Per-SVLAN traffic monitor 103. Preferably, for the rule to be fast, it must match the least bits as possible, so it may not get the desired distribution profile at the first attempt. In the previous example it was needed only to match one bit, a very lightweight operation, easily implementable by hardware. However, it may turn out that the big traffic flows are sent with uneven addresses. For example, the system can detect that 70% of the traffic is sent to one subcarrier and 30% to the other, so one subcarrier is congested, and the other one free. In that case, in another embodiment, the system will increase the matching to the last two bits of the address and try new mappings, to balance the situation.

After the S-VLAN tagged traffic has been measured, it is sent to its corresponding SBVT/subcarrier by means of a switch 104 (e.g. an Ethernet switch). This switch 104 matches the S-VLAN field and sends the output to the necessary subcarrier input port.

In an embodiment, the S-VLAN tag pusher module 102, Per-SVLAN traffic monitor 103 and the switch 104 are implemented in the same physical device. However, other implementation may choose to implement the three modules with separate hardware devices.

Once the traffic enters the SBVT or multi-flow transponders 105, it is an input for a given subcarrier. The subcarriers are modeled and grouped according to the instructions of the control plane. A transponder controller unit 108 configures the SVBT 105 with the necessary control commands, implementing the API of the transponder.

In reference to FIG. 11 it is illustrated all the elements that can be included in the proposed apparatus of the third aspect of the invention in accordance with different embodiments.

First monitoring means or Per-VLAN traffic monitor 101: This is the first module that receives the traffic packets frames, takes the necessary measurements, and forwards the packets to the next module. The module 101 measures bytes or packets per VLAN for a given time interval. Then, it computes the necessary peak rate for each VLAN. To that end, it obtains the percentage of time that the traffic is over a certain configurable threshold (typically 95% or 98% of the rate in Gbps of the subcarrier).

This module 101 is configured with a measurement interval and with threshold (expressed as a percentage). The percentage is used to calculate the peak traffic by the module 101. The peak traffic is the value such that the mean traffic per interval is lower time that such value for the T % of the time. This information is used outside the module 101 to assess if the number of subcarriers (that will indicate the total peak traffic assigned to such VLAN) are adequate.

Tag unit or S-VLAN tag pusher 102: The system of the invention dynamically maps the packet flows going to a given destination, identified by the VLAN field of the Ethernet packet, in multiple subcarriers. To achieve that, in the S-VLAN tag pusher unit 102, the system adds to each packet an S-VLAN tag, which identifies the subcarrier and SBVT where the packet is sent. The S-VLAN tag pusher is programmed with rules, which, depending of the packet, assign a specific S-VLAN tag. The rule indicates the set of fields of the packet that must be matched. In order to be efficient, and match the lower number of bits possible, a mask may be applied to some fields. For example, to match all packets whose IP address is even, a mask 0x00000001 is applied, and only the last bit is compared. If such bit is 0, it is an even address.

The rules that can be configured to the module are defined as: MATCH FIELD AND MASK PUSH S-VLAN_TAG S-VLAN_ID.

This module 102 can be configured, not excluding others, with the OpenFlow protocol, which has an adequate syntax to express the matching fields, matching fields applying a mask, and based on the matching, insert an S-VLAN tag. In the definition of the rule, the word MATCH indicates that the next field needs to be matched, FIELD is the name of the field of the header of the packet to be matched (e.g. IPv4 address) and MASK is the mask applied to the field to match (e.g. 0x00000001 to use just the last byte of the IPv4 address).

Second monitoring means or Per-SVLAN traffic monitor 103: This module measures bytes/packets per S-VLAN for a given time interval. Then, it computes the necessary peak rate for each S-VLAN. To that end, it obtains the percentage of time that the traffic is over a certain configurable threshold (typically 95% or 98% of the rate in Gbps of the subcarrier). It is used to give feedback of a desired traffic distribution.

Each S-VLAN must feed a subcarrier. The subcarriers have a fixed line rate in Gbps. Thus it is highly important that the rate is kept as close as possible to the line rate. If it is higher, traffic will need to be queued, and thus the traffic will encounter additional delay.

The module sends periodically the measured value pairs S-VLAN—necessary peak rate.

Switch 104: Once the packets have been classified according to the VLAN field and the rest of fields indicated by the rule, the packets are tagged with a S-VLAN field. The S-VLAN tagged packets are sent to the switch 104, which, depending on the S-VLAN field, it is forwarded to a given output port. Each output goes to a sub-carrier of a multi-flow transponder 105.

This module is able to configure which ports belong to a given S-VLAN and supports 802.1 ad Provider Bridges.

Multi-Flow Transponder or SVBT 105: This multi-flow transponder is also called sliceable bandwidth variable transponder (SVBT). This component has one input electrical port to modulate each subcarrier. Thus, inputs are electrical signals. The output is a fiber with a set of optical signals. As said before, there are different possibilities for multi-flow transponder, each using different modulation techniques.

Controller unit 106: Is in charge of the algorithmic decisions and interfaces with the control plane. It makes the mapping of VLANs to SVLANs, and decides the traffic to split. In addition, it is in charge of sending feedback to the control plane when it detects that for a given VLAN the number of subcarriers needed is lower or higher than the number of subcarriers requested. The threshold of when to send the alarm is configurable.

Transponder controller or SBVT Controller 108: Is in charge of sending commands to the SVBT 105. It configures which subcarriers are bundled together and the spectrum slot assigned to such set of subcarriers.

Interfaces:
External Interfaces
  201 External interface to Controller: This interface is defined for the communication between the controller unit 106 and the control plane. This interface supports standard protocols like OSPF or ISIS and RSVP or LDP.
  202 Input Ethernet Interface: This interface receives Ethernet traffic packets like a regular data plane.
  203 Fiber output interface: Fiber connection supports the transmission of optical signals between two nodes in the optical network.
Internal Interfaces
  204 Interface Per-VLAN monitor unit 101—S-VLAN tag pusher 102: This interface is a standard electrical interface where Ethernet frames are sent between modules.
  205 Interface S-VLAN tag pusher 102—Per-S-VLAN monitor unit 103: This interface is a standard electrical interface where Ethernet frames are sent between modules.
  206 Interface Per-S-VLAN monitor unit 103—Switch 104: This interface is a standard electrical interface where Ethernet frames are sent between modules.
  207 Interfaces Switch 104—Multi-flow Transponders 105: This interface is a standard electrical interface where Ethernet frames are sent between modules.
  208 Interface Controller unit 106—Per-VLAN Traffic monitor unit 101: The interface can be implemented with any standard management protocol (SNMP, netconf, etc.).
    The messages sent from the Controller to S-VLAN monitor include, at least: Set Monitoring interval. Optionally, additional parameters to configure the algorithm to measure the peak traffic can be sent.
    The messages sent from Per-VLAN monitor to Rule Generator include: Measure Notification (S-VLAN, Peak traffic)
  209 Interface Controller unit 106—Rule Generator unit 107: The interface can be implemented with any standard management protocol (SNMP, netconf, etc.).
  The messages sent from the Controller to the Rule Generator include, at least: Create Rule (VLAN, (SET_OF_PAIRS)), where SET_OF_PAIRS is a set of the following pairs: S-VLAN, percentage. For example, to create a rule that the VLAN 101 is sent 50% to S-VLAN 220 and 50% to S-VLAN 230: Create Rule (101, ([220, 50%], [230, 50%]).
  210 Interface Rule Generator unit 107—S-VLAN tag pusher 102: The interface can be implemented with the OpenFlow protocol, not precluding others. The messages that need to be sent from Rule Generator to S-VLAN tag pusher are:
    ADD RULE: Ads a given RULE to the S-VLAN tag pusher 102.
    DELETE RULE: Deletes a given RULE in the S-VLAN tag pusher 102.
    CLEAR ALL_RULES: Deletes all rules in the S-VLAN tag pusher 102.
  RULE is defined as:
    MATCH (VLAN_ID, FIELD AND MASK)
    PUSH S-VLAN_TAG S-VLAN_ID
    The word MATCH indicates that the next field needs to be matched
    FIELD is the name of the field to match (e.g. IPv4 address)
    VLAN_ID is the id of the VLAN to which the rule applies.
    MASK is the mask applied to the field to match (e.g. 0x00000001 to use just the last byte of the IPv4 address).
    S_VLAN_ID is the ID of the S_VLAN tag to be pushed
    The only action supported in the rules is PUSH, that is, add a tag to the packet.
  The messages that need to be sent from Rule Generator to S-VLAN tag pusher are:
    OK: The rule has been successfully installed.
    NOK: An error has occurred and the rule could not be instantiated.

211 Interface Rule Generator unit 107—S-VLAN monitor unit 103: The interface can be implemented with any standard mechanism. The messages sent from Rule Generator to S-VLAN monitor include, at least:
Monitoring interval. Optionally, additional parameters to configure the algorithm to measure the peak traffic can be sent.
The messages sent from S-VLAN monitor unit 103 to Rule Generator unit 107 include: set of value pairs (S-VLAN, Peak traffic).
212 Interface Rule Generator unit 107—Switch 104: This interface can be OpenFlow if the switch supports it or any other management protocol for Ethernet switches.
213 Interface Controller unit 106—Transponder Controller 108: Connects the controller and the transport controller.
214 Interface Transponder Controller 108—SBVT 105: This interface configures the SBVT 105, thus is modulation format, number of carriers, etc.

Characteristically, the Rule generator unit 107 maintains, for each VLAN_ID the percentage of traffic that needs to go to a given subcarrier. The subcarrier is identified uniquely by a SVLAN. Traffic from different VLANs can be mapped in the same SVLAN. Based on the information, the following procedure is executed:

For each VLAN_ID: a. calculates the number of different SVLANs. Such number is NUM_SVLAN_PER_VLAN and b. if there is a single SVLAN, add the rule: MATCH (VLAN=VLAN_ID) PUSH-VLAN_TAG_SVLAN_ID. On the other hand, c. if there are more SVLANs, calculates the minimum granularity.

The granularity is the number of bits of the mask. From the granularity, creates the mask. For example, for 2 SVLANs, min_granularity is 2, the mask is 0x00000001 Min_gran=log 2(NUM_SVLAN_PER_VLAN). Then, d. from VALUE=0 to min_gran−1, create a rule: MATCH (VLAN=VLAN_ID) AND ((IPv4 AND MASK)=VALUE) PUSH S-VLAN_TAG S-VLAN_ID. The mask is the number of granularity minus 1, preceded by 0s. Example, for 2 SVLANs, min_granularity is 2. First, the mask is 0x00000001 and value is 0x00000000 the next, the mask is 0x00000001 and value is 0x00000001.

After the rules are set, feedback is received from the S-VLAN monitor unit 103. The information received is: S-VLAN—Traffic indicating that if traffic is higher than the subcarrier speed, then the flow distribution needs to be adjusted. The previous procedure is repeated for all VLANs that inject traffic in that S-VLAN, and the procedure is repeated, but increasing the granularity in 1.

According to an exemplary embodiment, present invention can be implemented for the auto adjustment of the network after initial network dimensioning. The network operator, based on the predicted traffic matrix will have made a dimensioning of the network and will initially assign to each source-destination pair a given path, and assign a set of sub-carriers of each multi-flow transponders 105. The information needed in the control plane is illustrated in Table 1:

TABLE 1

| Source Address in Transport Network | Destination Address in Transport Network | Interface to Transponder pool ID | VLAN | List of subcarriers (transponder/sc) |
|---|---|---|---|---|

Based on this knowledge, it is sent to the invention, through the controller interface 201, the mapping of VLAN and list of subcarriers (transponder id/subcarrier ID). The invention, through the controller interface 201 will send the association of subcarrier to S-VLAN, to be sent to the receiving side, and periodically will send, for each VLAN, the number of subcarriers needed.

The operator may use a Path Computation Element to make the necessary computations that assign for each source destination of the transport network a certain interface and number of subcarriers. It has to be noted that we are dealing with aggregated traffic, so the real source/destination addresses vary. How those computations are done is outside the scope of the invention.

As mentioned, initially an order is sent to the controller unit 106 of the transponder pool with the association of VLAN and list of subcarriers. During network operation, the controller 106 detects that the necessary number of subcarriers is different than assigned. It sends feedback via the controller interface 201 to the control plane. Then, network operator can decide to perform a re-planning of the network. Without the invention, an overprovisioning is needed to keep with the traffic peaks. However, with the invention, the overprovisioning needed is less, as the transponder pool can reconfigure and give the feedback.

Figure 12:
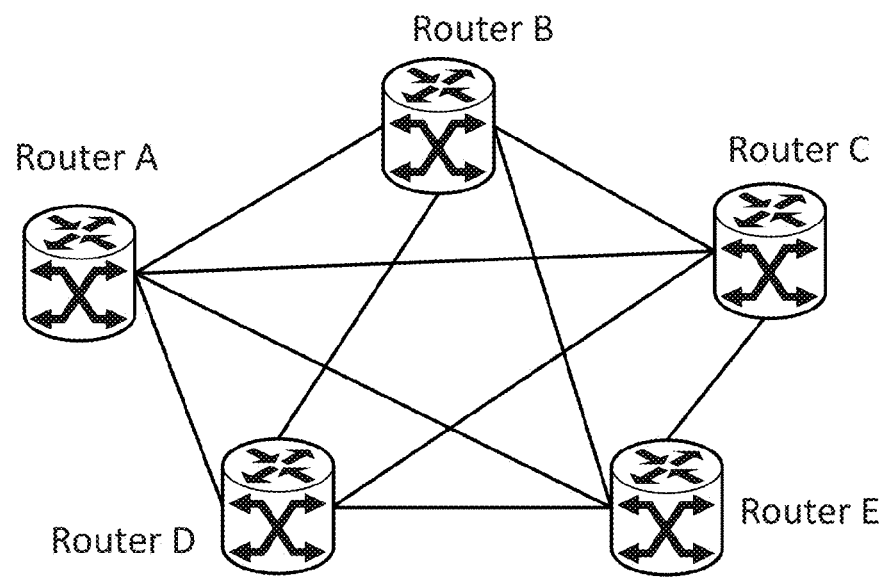
FIG. 12 illustrates a reference network including five routers in a full meshed topology.

A benchmarking between the proposed invention and existing SBVT solutions is now included. In this analysis a simple reference network composed by five routers in a full meshed topology is used as illustrated in FIG. 12.

Table 2 shows the minimum capacity to be installed between routers considering an over-provisioning ratio of 40%.

TABLE 2

|   | A | B | C | D | E |
|---|---|---|---|---|---|
| A | 0 | 112 | 56 | 84 | 56 |
| B | 42 | 0 | 126 | 28 | 70 |
| C | 70 | 70 | 0 | 140 | 84 |
| D | 98 | 56 | 42 | 0 | 98 |
| E | 126 | 28 | 70 | 112 | 0 |

Figure 1:
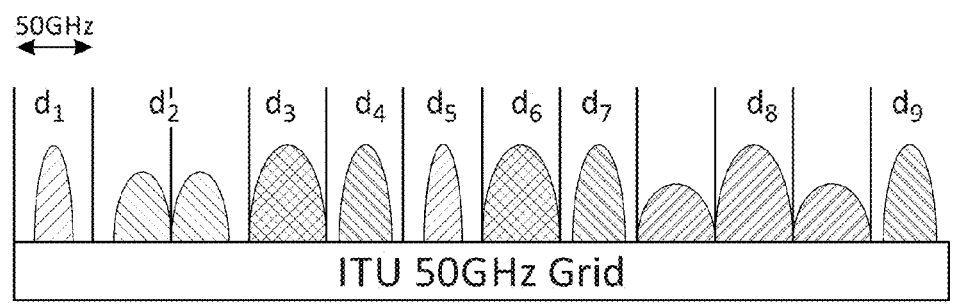
FIG. 1 is an example of an ITU standardized fixed grid spectrum allocation.
Figure 2:
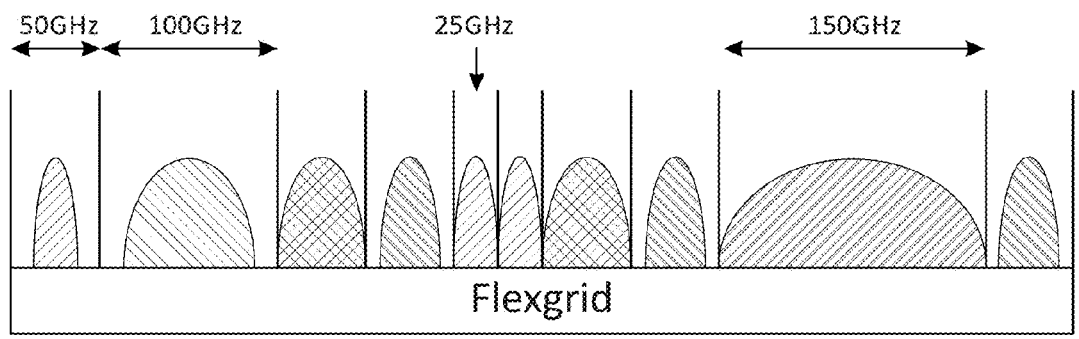
FIG. 2 illustrates how Flexgrid spectrum allocation makes sufficient space for large and small bandwidth demands.
Figure 3A:
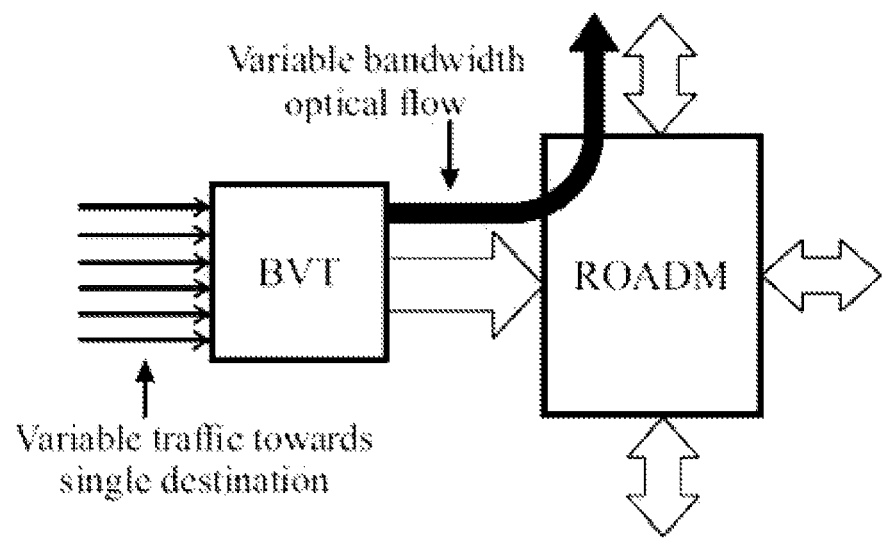
FIG. 3A is an illustration of the functionalities of a bandwidth variable transceiver (BVT).
Figure 3B:
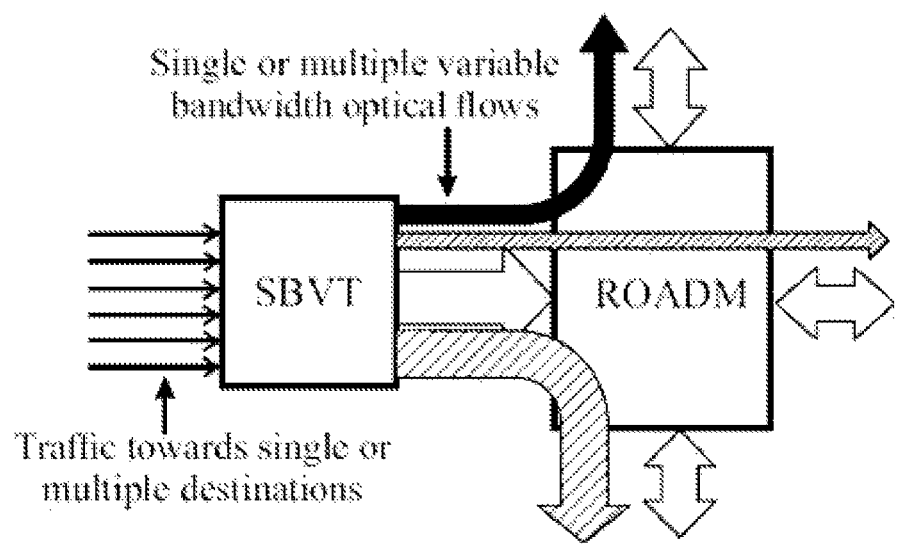
FIG. 3B is an illustration of the functionalities of a sliceable bandwidth variable transceiver (SBVT).
Figure 4A:
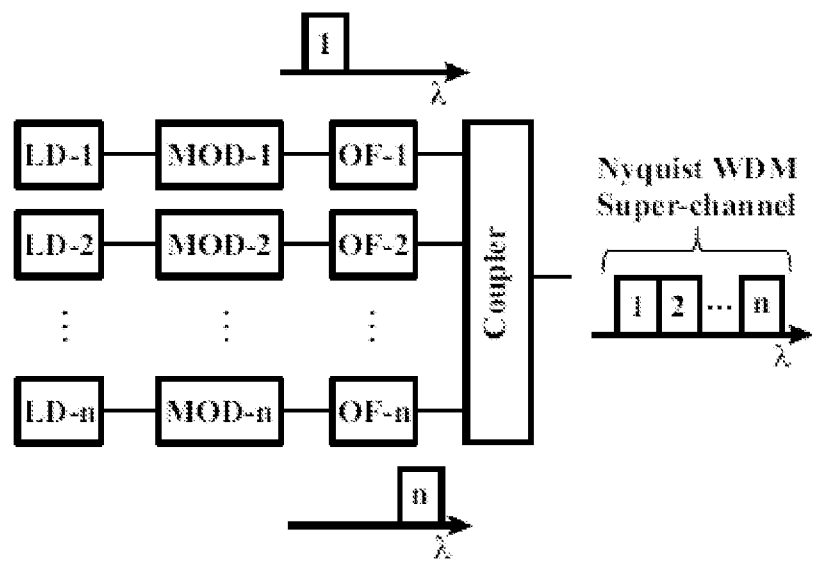
FIG. 4A is an illustration of a configuration based on Nyquist WDM of a Bandwidth Variable Transceiver.
Figure 4B:
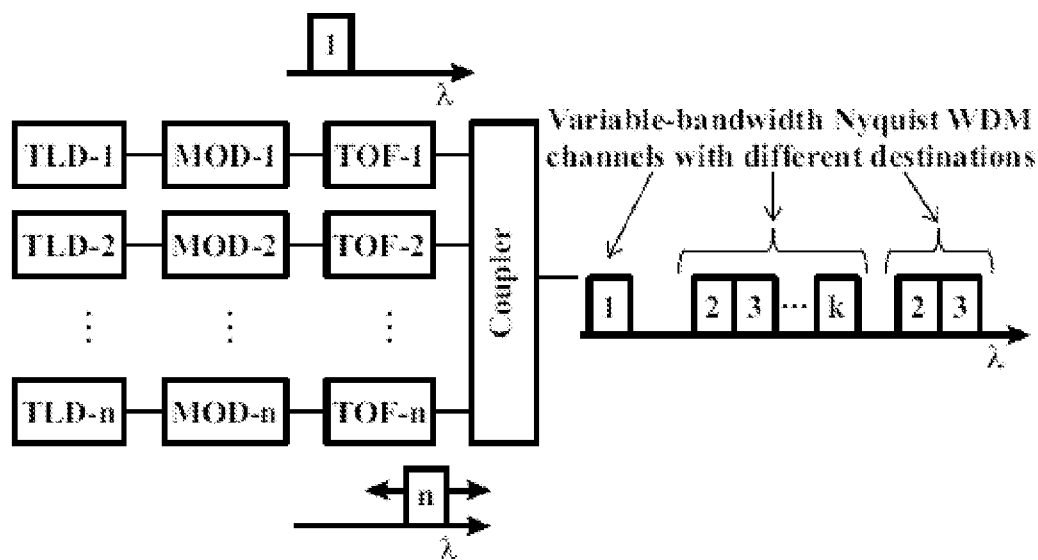
FIG. 4B is an illustration of a configuration based on Nyquist WDM of a Sliceable Bandwidth Variable Transceiver.
Figure 5:
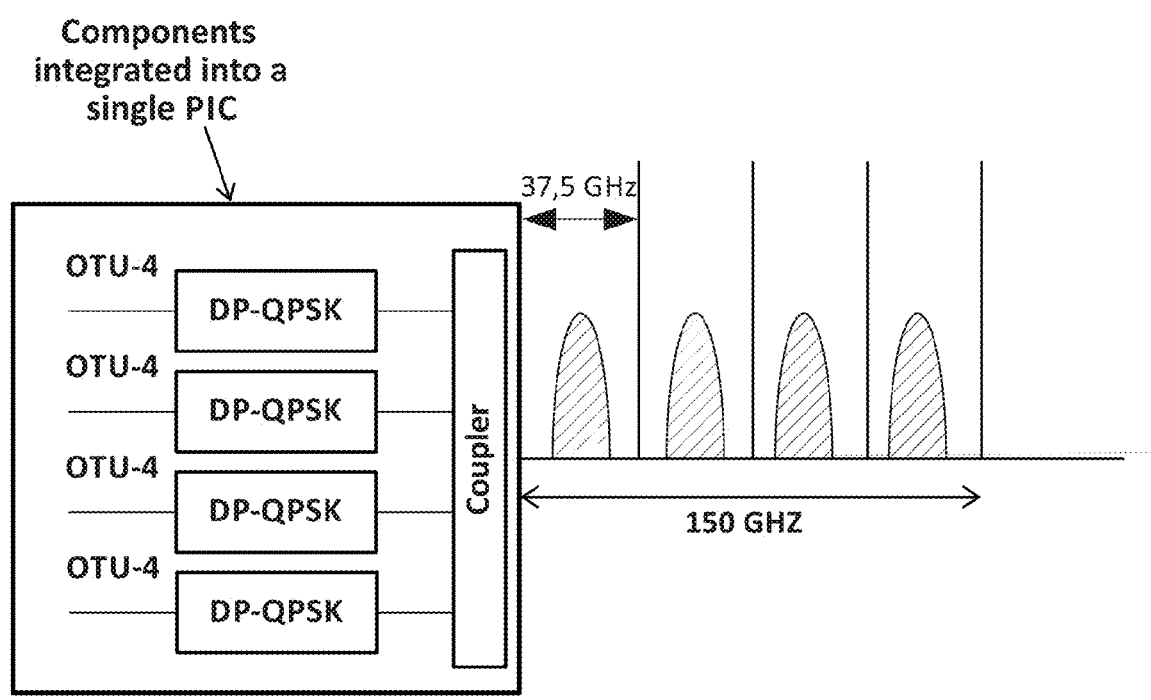
FIG. 5 is an example SBVT based on state of the art technologies.
Figure 7A:
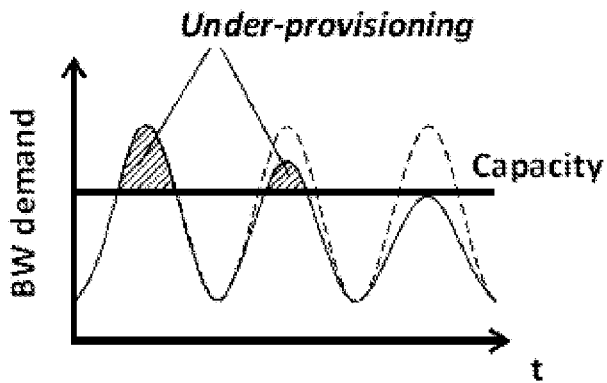
FIG. 7A illustrates an under-provisioning example to cope with users' demands when there is a fixed capacity.
Figure 7B:
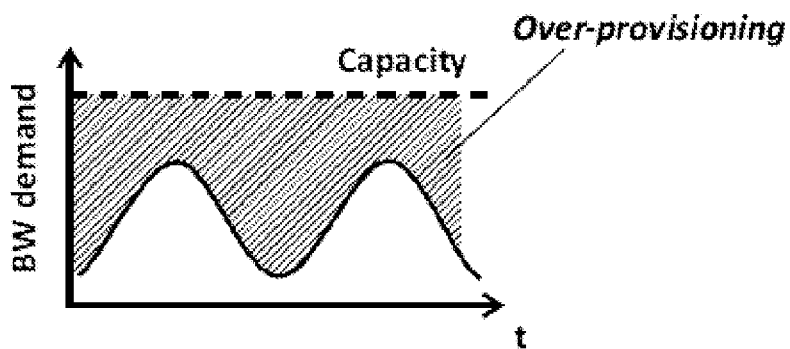
FIG. 7B illustrates an over-provisioning example to cope with users' demands when there is a fixed capacity.
Figure 8:
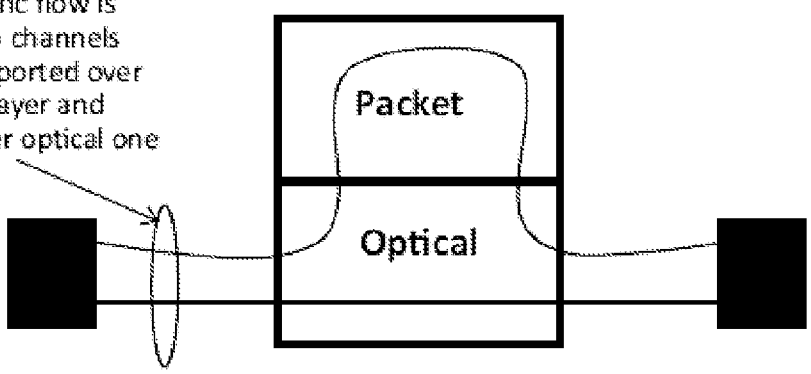
FIG. 8 is an example of how load balancing is performed between packet and optical layers.

Table 3 shows the number of subcarrier between nodes and S-BVTs per node considering state of the art 400 G S-BVT implementations (FIG. 5).

TABLE 3

|   | A | B | C | D | E |
|---|---|---|---|---|---|
| A |   | 2 | 1 | 1 | 1 |
| B | 1 |   | 2 | 1 | 1 |
| C | 1 | 1 |   | 2 | 1 |
| D | 1 | 1 | 1 |   | 1 |
| E | 2 | 1 | 1 | 2 |   |
| Total number of 100 Gbps subcarriers | 5 | 5 | 5 | 6 | 4 |
| Total number of S-BVT | 2 | 2 | 2 | 2 | 1 |

According to it, a network deployment based on existing S-BVT implementations would require 9 S-BVT for the reference scenario described in FIG. 12. On contrary, a network deployment based on the proposed invention would only need 5 S-BVTs.

Table 4 shoes the Number of state of the art 400 G S-BVTs per node.

TABLE 4

|  | A | B | C | D | E |
|---|---|---|---|---|---|
| Mean Traffic | 240 | 190 | 210 | 260 | 220 |
| Minimum output capacity to be installed per router considering 40% overprovisioning | 336 | 266 | 294 | 364 | 308 |
| Number of SBVT per node | 1 | 1 | 1 | 1 | 1 |

According to another exemplary embodiment, present invention can be implemented for multipath transmission in transport network. Calculations in the planning tool may decide that the capacity needed between two nodes of the transport network needs to be split among several paths, with different lengths. The planning tool will tell the sliceable transponder the set of separate subcarriers to use for a given VLAN. Then, the invention will take care of guaranteeing the order of the flows.

Figure 13:
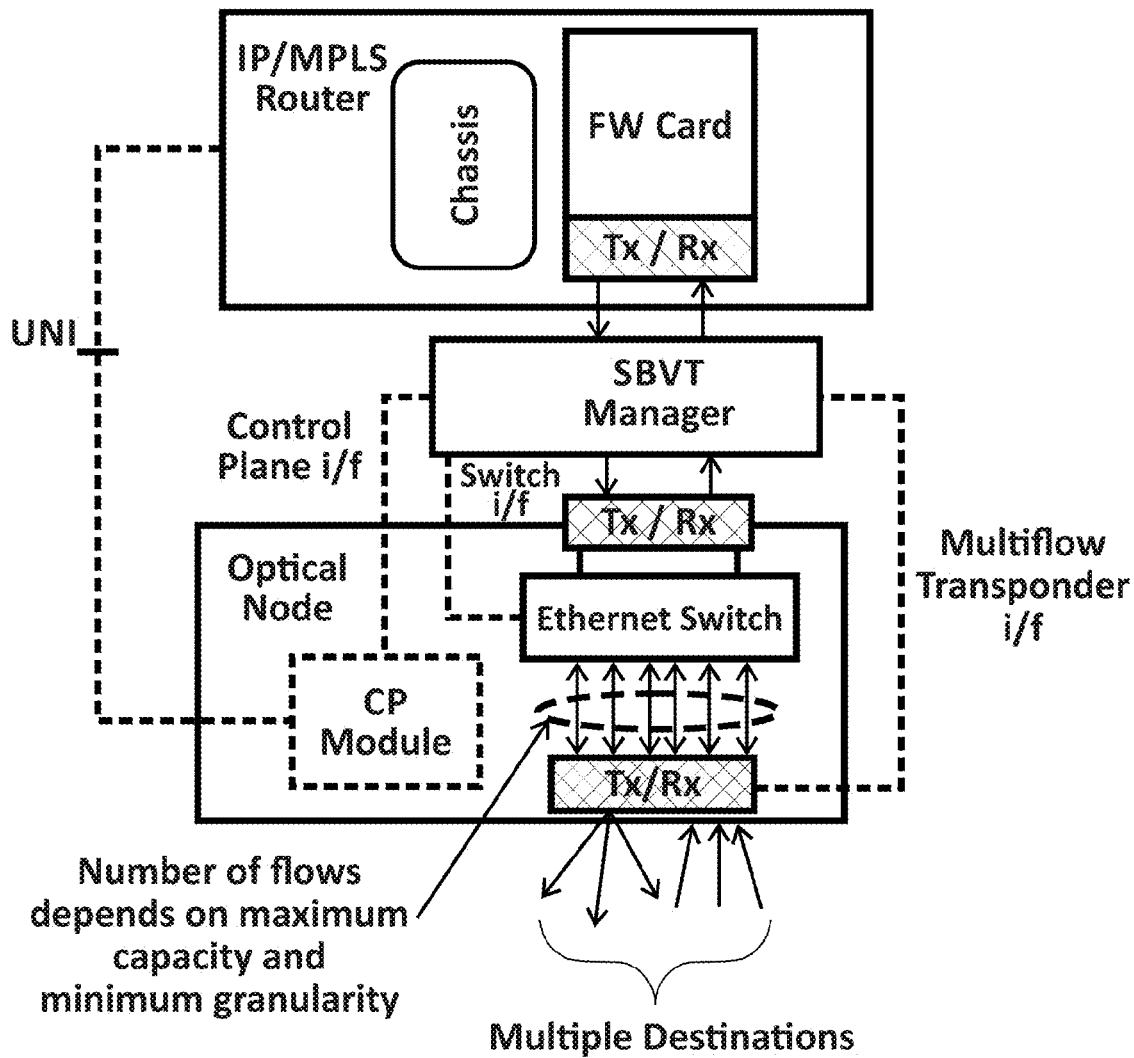
FIG. 13 illustrates an interaction between a control plane of a network when a new connection is requested from a router with a given bandwidth, according to an exemplary embodiment.

According to yet another exemplary embodiment, present invention can be implemented for requesting capacity from a router. In reference to FIG. 13 this embodiment presents the interaction between the control plane of the network and the invention when a new connection is requested from the router with a given bandwidth. So, IP/MPLS router is configured to launch a User to Network Interface (UNI) request to create a new connection in the optical network. This request contains the end-points, which are the origin and destination IP routers. The UNI request is received by the control plane module in the optical node, which obtains the end-to-end path between two SBVTs. There are two options for this process: To ask to the PCE for a new connection between the two SBVTs connected to the origin and destination IP routers or to use distribute routing protocol like OSPF.

This route (Explicit Route Object—ERO) is sent to the controller unit 106 from the control plane module. The controller analyzed the ERO:
1. There is just an optical connection in the ERO.
   1. The controller assigns a new VLAN to the Per-VLAN monitor unit 101.
   2. A request is sent to the Rule Generator 107 for the new flow.
      i. The rule generator 107 pushes a SVLAN rule to the S-VLAN pusher 102 and per S-VLAN monitor 103.
      ii. The relation between the S-VLAN and the path in the optical domain is sent to the Ethernet Switch 104 from the Rule Generator 107.
2. There is just a packet connection in the ERO. In this case, there is remaining bandwidth in previous optical connections, so it is not required to configure new optical paths. In this case, the controller 106 assigns a new VLAN to the Per-VLAN monitor 101. Moreover, the rule generator 107 pushes a SVLAN rule to the S-VLAN pusher 102 to map the incoming VLAN and the SVLAN.
3. There are optical and packet connections in the ERO. In this case an optical connection is created, but at the same time remaining bandwidth is reused.
   1. The controller 106 assigns two VLAN tags in the Per-VLAN monitor 101: one for the new VLAN and another for the remaining traffic in the Per-VLAN monitor 101.
   2. A request is sent to the Rule Generator 107 for the new flow.
      i. The rule generator 107 pushes a SVLAN rule to the S-VLAN pusher 102 and per S-VLAN monitor 103.
      ii. The relation between the S-VLAN and the path in the optical domain is sent to the Ethernet Switch 104 from the Rule Generator 107.

Once the configuration is done by the controller unit 106, the SBVT 105 replies to the optical node controller with the VLANs used for the mapped traffic. The optical node controller configures the optical layer and replies to the IP router adding the VLAN information.

Following steps about the behavior of the invention are described when there are traffic changes in the network:

Once original connections are created, the IP routers send traffic to multiple destinations over single ports (e.g. 400 G). Traffic to each destination is tagged with a different Client Virtual Local Area Network (CVLAN). This aggregated traffic flow is sent to an S-BVT. The S-BVT manager is monitoring traffic per CVLAN and adds SVLAN to have QinQ. While the CVLAN tag identifies a destination router, the SVLAN is added by the Ethernet switch 104 to map the packet flow to an optical connection.

When the traffic is above a threshold (e.g. 90% of the channel granularity), the S-BVT send a command to both source an destination routers in order to create another packet connection for the same traffic flow (i.e. another SVLAN). Highest capacity packet connections (e.g. 90% of the channel granularity) are sent over single optical carrier which directly sent to its destination over the optical network. Lowest capacity CVLANs are aggregated into a single carrier (e.g. 100 Gbps) and transported over an IP/MPLS or OTN switching network.

The scope of the present invention is defined in the following set of claims.

The invention claimed is:

1. A method for efficient multilayer optical networking, the method comprising:
   receiving, by a first monitoring unit, traffic packets from a first packet generating device, each one of said traffic packets including an embedded virtual LAN (VLAN) tag indicating a destination of a second packet generating device;
   analyzing, by said first monitoring unit during a period of time, bytes content of said received tagged traffic packets and reporting a result of said analysis to a controller unit;
   receiving, by said controller unit, a plurality of different subcarriers to be used for sending said received tagged traffic packets to a corresponding destination;
   adding, by a tag unit, an embedded secondary virtual LAN (S-VLAN) tag to said analyzed tagged traffic packets, identifying based upon said corresponding destination to which subcarrier and to which sliceable bandwidth variable transponder in an optical network each tagged traffic packet is to be sent, said adding being based on a mapping procedure executed by a rule generator unit indicating which field of the received tagged traffic packets is to be matched, said matching procedure at least matching a last bit of the received tagged traffic packets with a rule programmed into said rule generator unit;
   sending said S-VLAN tagged traffic packets to a switch, the switch forwarding said S-VLAN tagged traffic packets to a given port of said identified sliceable bandwidth variable transponder; and sending, by said identified sliceable bandwidth variable transponder, said received tagged traffic packets via said plurality of different sub-carriers to a corresponding destination, said plurality of different sub-carriers following a same or different path, wherein said mapping procedure includes a feedback mechanism performed by a second monitoring unit analyzing traffic of said identified subcarriers during a period of time.

2. The method of claim 1, wherein said analyzing is continuously performed.

3. The method of claim 2, further comprising notifying, by said controller unit, a control plane of said optical network of said reported result, said control plane determining in response to said notifying whether or not to modify said plurality of different sub-carriers.

4. The method of claim 1, wherein the period of time in which said traffic of the identified subcarrier is analyzed and the period of time in which the bytes content of the received tagged traffic packets are analyzed are the same.

5. The method of claim 1, wherein said mapping procedure comprises matching at least a last two bits of the received tagged traffic packets with a rule programmed into said rule generator unit.

6. A system for efficient multilayer optical networking, the system comprising:
- a first monitor configured to receive, from a first packet generating device, traffic packets including an embedded virtual LAN (VLAN) tag indicating a destination of a second packet generating device and to analyze, during a period of time, bytes content of said received tagged traffic packets and to report a result of said analysis to a controller;
- said controller configured to receive a plurality of different subcarriers to be used for sending said received tagged traffic packets to a corresponding destination;
- a tagger configured to add a secondary virtual LAN (S-VLAN) tag to said analyzed tagged traffic packets and to identify, based upon said corresponding destination, to which subcarrier and to which sliceable bandwidth variable transponder in an optical network each tagged traffic packet is to be sent;
- a rule generator unit configured to indicate which field of the received tagged traffic packets is to be matched in a matching procedure at least matching a last bit of the received tagged traffic packets with a rule programmed into said rule generator unit;
- a transmitter configured to send said S-VLAN tagged traffic packets to a switch unit, the switch unit being configured to forward said S-VLAN tagged traffic packets to a given port of said identified sliceable bandwidth variable transponder;
- at least one of said sliceable bandwidth variable transponder in an optical network configured to send said received tagged traffic packets via said plurality of different sub-carriers to said corresponding destination, said plurality of different sub-carriers following a same or different path;
- a plurality of interfaces configured to connect said first monitor, said controller, said tagger, said rule generator unit, said transmitter, and said at least one sliceable bandwidth variable transponder; and
- a second monitor configured to analyze traffic of said identified subcarriers during a period of time and to report a feedback of said monitoring to said tagger.

7. The system of claim 6, wherein said first and second packet generating devices comprises a router.

8. The system of claim 7, wherein said tagger and said switch unit are configured to implement an OpenFlow protocol.

9. The system of claim 6, wherein said tagger, said second monitor and said switch unit are arranged in a same physical device.

10. The system of claim 6, wherein said tagger, said second monitor and said switch unit are different physical devices.

11. An apparatus for efficient multilayer optical networking, the apparatus comprising:
- a first monitor configured to receive, from a first packet generating device, traffic packets including an embedded virtual LAN (VLAN) tag indicating a destination of a second packet generating device and to analyze, during a period of time, bytes content of said received tagged traffic packets and to report a result of said analysis to a controller;
- said controller configured to receive a plurality of different subcarriers of a sliceable bandwidth variable transponder of an optical network to be used for sending said received traffic packets to a corresponding destination;
- a tagger configured to add a secondary virtual LAN (S-VLAN) tag to said analyzed tagged traffic packets, and to identify, based upon said corresponding destination, to which subcarrier and to which sliceable bandwidth variable transponder each tagged traffic packet is to be sent,
- a rule generator unit configured to indicate which field of the received tagged traffic packets is to be matched in a matching procedure at least matching a last bit of the received tagged traffic packets with a rule programmed into said rule generator unit;
- a switch unit configured to forward said S-VLAN tagged traffic packets to a given port of said identified sliceable bandwidth variable transponder; and
- second monitor configured to analyze traffic of said identified subcarriers during a period of time and to report a feedback of said monitoring to said tagger.

12. The apparatus of claim 11, further including a transponder controller configured to configure the sliceable bandwidth variable transponder with a number of subcarriers that are bundled together, to configure an assigned spectrum slot of the sliceable bandwidth variable transponder and its modulation format including QPSK or QAM-X.

* * * * *